(12) United States Patent
Calsyn et al.

(10) Patent No.: US 8,572,229 B2
(45) Date of Patent: Oct. 29, 2013

(54) DISTRIBUTED COMPUTING

(75) Inventors: Martin Calsyn, Cambridge (GB);
Alexander Brandle, Cambridge (GB);
Vassily Lyutsarev, Cambridge (GB);
Andreas Heil, Linkenheim (GB)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 12/790,172

(22) Filed: May 28, 2010

(65) Prior Publication Data

US 2011/0296250 A1    Dec. 1, 2011

(51) Int. Cl.
*G06F 15/16* (2006.01)
*G06F 12/00* (2006.01)

(52) U.S. Cl.
USPC .......................................... 709/223; 709/250

(58) Field of Classification Search
USPC ................................ 709/203, 223–229, 250
See application file for complete search history.

(56) References Cited

U.S. PATENT DOCUMENTS

| | | | | |
|---|---|---|---|---|
| 4,914,586 | A * | 4/1990 | Swinehart et al. ..................... 1/1 |
| 5,295,244 | A * | 3/1994 | Dev et al. ....................... 715/853 |
| 5,551,037 | A | 8/1996 | Fowler et al. |
| 5,966,072 | A | 10/1999 | Stanfill et al. |
| 6,049,828 | A * | 4/2000 | Dev et al. ....................... 709/224 |
| 6,144,379 | A * | 11/2000 | Bertram et al. ................ 715/835 |
| 6,259,448 | B1 * | 7/2001 | McNally et al. .............. 715/733 |
| 6,346,954 | B1 * | 2/2002 | Chu et al. ....................... 715/764 |
| 6,466,953 | B1 * | 10/2002 | Bonney et al. ................. 715/234 |
| 7,174,370 | B1 | 2/2007 | Saini et al. |
| 7,316,001 | B2 * | 1/2008 | Gold et al. ..................... 717/108 |
| 7,937,704 | B2 | 5/2011 | McKee |
| 2002/0188619 | A1 * | 12/2002 | Low ........................... 707/104.1 |
| 2006/0075407 | A1 | 4/2006 | Powers et al. |
| 2006/0112123 | A1 | 5/2006 | Clark et al. |
| 2007/0100961 | A1 | 5/2007 | Moore |
| 2008/0028300 | A1 | 1/2008 | Krieger et al. |
| 2008/0250329 | A1 | 10/2008 | Stefik et al. |
| 2008/0276252 | A1 | 11/2008 | Pronovost et al. |
| 2009/0063998 | A1 | 3/2009 | Huang et al. |
| 2009/0157590 | A1 | 6/2009 | Mijares et al. |
| 2009/0276771 | A1 | 11/2009 | Nickolov et al. |
| 2009/0313331 | A1 | 12/2009 | Rasmussen et al. |
| 2009/0327302 | A1 | 12/2009 | Richardson et al. |

OTHER PUBLICATIONS

"2020 Science", retrieved on May 8, 2009 at <<http://research.microsoft.com/en-us/um/cambridge/projects/towards2020science/downloads/T2020S_Report.pdf>>, Microsoft Corporation 2006, 43 pages.

(Continued)

*Primary Examiner* — Zarni Maung
(74) *Attorney, Agent, or Firm* — Zete Law, P.L.L.C.; MacLane C. Key

(57) ABSTRACT

Distributed computing is described. In an embodiment a user drags and drops an icon representing specified functionality into a graph layout view of a distributed computing graph in order to control a distributed computing system. For example, the distributed computing graph controls currently executing processes in a distributed computing system. In an embodiment a dynamic mapping between the graph layout view and the distributed computing graph occurs such that the functionality of the icon is implemented. For example, the icon may represent a data bus connecting some of the currently executing processes and used to implement check pointing and/or caching mechanisms. In other examples the icon represents any of a spooler-player mechanism, debugging tools, multi-scale visualization tools, and data driven visualization tools.

20 Claims, 18 Drawing Sheets

(56) References Cited

OTHER PUBLICATIONS

Adams, et al., "Understanding height-structured competition in forests: is there an R for light?", retrieved on May 8, 2009 at <<http://www.ph.ed.ac.uk/~s0676158/pdf/adams_etal_07.pdf>>, Proceedings of the Royal Society B (2007) 274, pp. 3039-3047, published online Oct. 10, 2007.

"Amazon Simple Storage Service Developer Guide", retrieved on May 12, 2009 at <<http://docs.amazonwebservices.com/AmazonS3/2006-03-01/>>, Apr. 9, 2009, 4 pages.

Belhajjame, "Semantic Replaceability of eScience Web Services", retrieved on May 8, 2009 at <<http://ieeexplore.ieee.org/stamp/stamp.jsp?arnumber=04426918>>, Third IEEE International Conference on e-Science and Grip Computing, IEEE 2007, pp. 449-456.

Bethel, et al., "VACET: Proposed SciDAC2 Visualization and Analytics Center for Enabling Technologies", retrieved on Apr. 8, 2010 at <<http://www.sci.utah.edu/~csilva/papers/VACET_SciDAC06_LBNL-60413.pdf>>, Journal of Physics: Conference Series, vol. 46, No. 1, 2006, pp. 561-569.

Brodlie, et al., "Distributed and Collaborative Visualization", retrieved on Apr. 8, 2010 at <<http://www.comp.leeds.ac.uk/vvr/gViz/publications/CGF_dcvstar.pdf>>, The Eurographics Association and Blackwell Publishing, Computer Graphics Forum, vol. 23, No. 2, 2004, pp. 223-251.

De Roure, et al., "myExperiment—A Web 2.0 Virtual Research Environment", retrieved on May 8, 2009 at <<http://eprints.ecs.soton.ac.uk/13961/1/myExptVRE31.pdf, 4 pages.

"ESSE Visualization Plugin for NASA World Wind", retrieved on May 12, 2009 at <<http://www.codeplex.com/VisualEsse>>, May 6, 2007, 1 page.

"Excel Home Page—Microsoft Office Online", retrieved on May 12, 2009 at <<http://office.microsoft.com/en-us/excel/FX100487621033.aspx, Microsoft Corporation 2009, 1 page.

Freeman, et al., "Cyberinfrastructure for Science and Engineering: Promises and Challenges", retrieved on May 8, 2009 at http://ieeexplore.ieee.org/stamp/stamp.jsp?tp=&isnumber=&arnumber=1398020>>, from the Proceedings of the IEEE, vol. 93, No. 3, Mar. 2005, pp. 682-691.

Gu, et al., "Falcon: On-line Monitoring and Steering of Parallel Program", retrieved on May 8, 2009 at <<http://citeseerx.ist.psu.edu/viewdoc/download?doi=10.1.1.53.3989&rep=rep1&type=pdf>>, Submitted to the IEEE TPDS—Nov. 1994, Revised Sep. 1995, pp. 1-46.

Hart, et al., "Interactive Visual Exploration of Distributed Computations", retrieved on May 8, 2009 at <<http://citeseerx.ist.psu.edu/viewdoc/download?doi=10.1.1.27.5278&rep=rep1&type=pdf>>, Department of Computer Science Washington University in Saint Louis, 7 pages.

Heikkinen, et al., "Methods and uncertainties in bioclimatic envelope modelling under climate change", retrieved on May 8, 2009 at http://www.mncn.csic.es/pdf_web/maraujo/Heikkinen_et_al_PPG2006.pdf, Progress in Physcial Geography 30, 6 (2006), pp. 1-27.

Heil, "LCARS—The Next Generation Programming Context", retrieved on May 8, 2009 at <<http://delivery.acm.org/10.1145/1150000/1145711/p29-heil.pdf?key1=1145711&key2=9111912421&coll=GUIDE&dl=GUIDE&CFID=34321032&CFTOKEN=41524811, AVI 2006, May 23, 2006, Venice, Italy, pp. 29-31.

Hey, et al., "Cyberinfrastructure for e-Science", retrieved on May 12, 2009 at <<http://www.sciencemag.org/cgi/content/abstract/308/5723/817, Science Magazine, May 6, 2005, vol. 38, No. 5723, 2 pages.

Hey, et al., "The Data Deluge: An e-Science Perspective", retrieved on May 8, 2009 at <<http://www.rcuk.ac.uk/cmsweb/downloads/rcuk/research/esci/datadeluge.pdf>>, To be Published in Grip Computing-Making the Global Infrastructure a Reality, Wiley, Jan. 2003, pp. 1-17.

Hey, et al., "The UK e-Science Core Programme and the Grid", retrieved on May 8, 2009 at <<http://eprints.ecs.soton.ac.uk/7644/1/UKeScienceCoreProg.pdf>>, Future Generation Computer Systems 18 (2002) pp. 1017-1031.

Hinckley, et al., "InkSeine: In Situ Search for Active Note Taking", retrieved on May 8, 2009 at <<http://research.microsoft.com/en-us/um/people/kenh/papers/InkSeine-CHI2007.pdf, CHI 2007, Apr. 28-May 3, 2007, San Jose, CA., 10 pages.

Hornik, "R FAQ—Frequently Asked Questions on R", retrieved on May 12, 2009 at <<http://CRAN.R-project.org/doc/FAQ/R-FAQ.html, Version 2.9.2009-04-28, 130 pages.

Hull, et al., "Taverna: a tool for building and running workflows of services", retrieved on May 12, 2009 at <<http://nar.oxfordjournals.org/cgi/content/full/34/suppl_2/W729>>, Nucleic Acids Research 2006 34 (Web Server issue): 11 pages.

Kaugars, et al., "PARVIS: Visualizing Distributed Dynamic Partioning Algorithms", retrieved on May 8, 2009 at << http://citeseerx.ist.psu.edu/viewdoc/download;jsessionid=558A2D24E991550A7BC92A2E4BFCE81B?doi=10.1.1.43.5962&rep=rep1&type=pdf>>, Department of Computer Science, Western Michigan University, MI, 7 pages.

Kumar, et al., "IFLOW: Resource-Aware Overlays for Composing and Managing Distributed Information Flows", retrieved on Apr. 8, 2010 at <<http://www.cc.gatech.edu/systems/papers/schwan/Kumar051FL.pdf>>, ACM, Proceedings of EuroSys, Leuven, BE, Apr. 18, 2006, pp. 1-14.

Lesk, "Online Data and Scientific Progress: Content in Cyberinfrastructure", 2004.

Lopez-Benitez, et al., "Simulation of Task Graph Systems in Heterogeneous Computing Environments", retrieved on May 12, 2009 at <<http://ieeexplore.ieee.org/stamp/stamp.jsp?arnumber=765116&isnumber=16539>>, Department of Computer Science, College of Engineering, Texas Tech University, 13 pages.

"Microraptor: A Distributed Process Management and Control System", retrieved on May 12, 2009 at <<http://www.microraptor.org/>>, Jan. 12, 2007, 2 pages.

Mishchenko, et al., "Distributed Visualization Framework Architecture", retrieved on Apr. 8, 2010 at <<ftp://ftp.cse.ohio-state.edu/pub/tech-report/2008/TR20.pdf>>, IEEE Transactions on Visualization and Computer Graphics, vol. 14, No. 6, 2008, pp. 1173-1180.

"MM5 Community Model", retrieved on May 12, 2009 at <<http://www.mmm.ucar.edu/mm5>>, 1 page.

Muggleton, "Exceeding Human Limits", retrieved on May 8, 2009 at <<http://dev.pubs.doc.ic.ac.uk/mugg-limits/mugg-limits.pdf>>, Nature Publishing Group, vol. 440, Mar. 23, 2006, pp. 409-410.

"myExperiment", retrieved on May 8, 2009 at <<http://www.myexperiment.org/>>, The University of Manchester and University of Southampton, 2007-2008, 4 pages.

"myExperiment: Social Networking for Workflow-using eScientists", retrieved on May 8, 2009 at <<http://eprints.ecs.soton.ac.uk/15095/1/Works112v-goble2.pdf>>, WORKS 2007, Jun. 25, 2007, Monterey, CA., 2 pages.

"Nasa World Wind", retrieved on May 12, 2009 at <<http://worldwind.arc.nasa.gov>>, 2 pages.

Neophytou, et al., "WhiteBoard P2P: A Peer-to-Peer Reliable Data Dissemination Infrastructure for Collaborative Applications", retrieved on Apr. 12, 2010 at <<http://www.cs.pitt.edu/~panickos/publications/conference/wbp2p-isyc06.pdf>>, International Conference on Intelligent Systems and Computing: Theory and Applications (ISYC), Ayia Napa, CY, Jul. 2006, pp. 317-326.

Preston, et al., "Simulation-based Architectural Design and Implementation of a Real-time Collaborative Editing System", retrieved on Apr. 12, 2010 at <<http://delivery.acm.org/10.1145/1410000/1404730/p320-preston.pdf?key1=1404730&key2=0816601721&coll=GUIDE&dl=GUIDE&CFID=75646207&CFTOKEN=10570869>>, Society for Computer Simulation International, Proceedings of the Spring Simulation Multiconference, vol. 2, Norfolk, VA, 2007, pp. 320-327.

Purves, et al., "Crown Plasticity and Competition for Canopy Space: A New Spatially Implicit Model Parameterized for 250 North American Tree Species", retrieved on May 12, 2009 at <<http://research.microsoft.com/apps/pubs/default.aspx?id=68031, Jan. 2007, 1 page.

(56) References Cited

OTHER PUBLICATIONS

Rose, et al., "Plasma: a graph based distributed computing model", retrieved on May 8, 2009 at <<http://rosejn.net/publications/plasma_graphs.pdf>>, University of Lugano Faculty of Informatics, Switzerland, pp. 1-6.

Russell, et al., "The Cost Structure of Sensemaking", retrieved on May 8, 2009 at <<http://delivery.acm.org/10.1145/170000/169209/p269-russell.pdf?key1=169209&key2=8911912421&coll=GUIDE&dl=GUIDE&CFID=34321171&CFTOKEN=99489322>>, Interchi 1993, Apr. 24-29, pp. 269-276.

Shanahan, et al., "Amazon.com Mashups", retrieved on May 12, 2009 at <<http://www.amazon.com/Amazon-com-Mashups-Francis-Shanahan/dp/0470097779>>, 10 pages.

Smith, "Monitoring Ecosystems the High-tech Way", Computer World, Canada, Mar. 7, 2009.

Strigul, et al., "Crown Plasticity and Large-scale Forest Dynamics: A New Method of Modeling Vegetation Dynamics", Ecological Monographs (in press).

"Taverna Project Website", retrieved on May 12, 2009 at <<http://taverna.sourceforge.net/>>, 1 page.

Walker, et al., "An Instrumentation System for Post-Mortem Visualization of Distributed Algorithm", retrieved on May 8, 2009 at <<http://ieeexplore.ieee.org/stamp/stamp.jsp?arnumber=592231&isnumber=12954>>, IEEE 1997, pp. 684-687.

Weis, et al., "Rapid Prototyping for Pervasive Applications", retrieved on May 8, 2009 at <<http://ieeexplore.ieee.org/stamp/stamp.jsp?tp=&arnumber=4160609, Pervasive Computing, Published by the IEEE Computer Society, 2007, pp. 76-84.

Zhang, "OptiStore: An On-Demand Data Processing Middleware for Very Large Scale Interactive Visualization", retrieved on Apr. 8, 2010 at <<http://snorky.evl.uic.edu/files/pdf/OptiStore.Thesis.pdf>>, University of Illinois at Chicago, Doctoral Thesis, 2007, pp. 1-173.

Zhao, et al., "Distributed execution of aggregated multi domain workflows using an agent framework", retrieved on May 8, 2009 at <<http://ieeexplore.ieee.org/stamp/stamp.jsp?arnumber=04278795>>, 2007 IEEE Congress on Services (Services 2007), 8 pages.

Zhao, et al., "Swift: Fast, Reliable, Loosely Coupled Parallel Computation", retrieved on May 8, 2009 at <<http://www.ci.uchicago.edu/swift/papers/Swift-SWF07.pdf, to appear: 2007 IEEE International Workshop on Scientific Workflows, Salt Lake City, Utah, 9 pages.

Zhizhin, et al., "Environmental Scenario Search and Visualization", retrieved on May 8, 2009 at <<http://esse.wdcb.ru/papers/EnvironmentalScenarioSearchAndVisualization.pdf>>, ACM GIS 2007, Nov. 7-9, 2007, Seattle, WA., 10 pages.

Office Action for U.S. Appl. 12/484,773, mailed on Mar. 6, 2012, Andreas Heil, "Distributed Computing Management", 15 pgs.

Office Action for U.S. Appl. No. 12/484,773, mailed on Oct. 27, 2011, Andreas Heil, "Distributed Computing Management", 18 pgs.

\* cited by examiner

DISTRIBUTED COMPUTING

BACKGROUND

Distributed computing is required in many application domains. For example, computational science, management of distributed database systems, management of distributed computing systems for bio-informatics, image analysis, or other applications in which very large amounts of data are to be processed or huge amounts of computational resources are required. However, orchestration of complex data flows of substantial amounts of data from live (streaming) sources is difficult with existing approaches.

The use of distributed computing systems is becoming more widespread. Often computational processes are decomposed into multiple subprocesses which are executed on different computing systems or computational processes are divided into fragments and the fragments are spread over multiple systems to be computed. Management of these distributed computing systems is typically carried out by a single entity which "owns" the computational process and there is a general need to simplify and improve the manner in which the management is achieved. For example, existing tools to manage scientific workflows enable a scientist to make use of remote computing resources to carry out in-silico experiments. However, it is difficult to enable the experiments to be managed by multiple users working on different computers at the same time in a simple and effective manner. In addition, existing approaches are often unsuited to novice users who have little or no knowledge of remote computing resources that may be used.

There is an increasing need to harness the cumulative power of multiple computing devices owned by a single person (e.g. an individual's laptop, office desktop computer and home computer) or to harness the power of grid and cloud computing. However, current systems do not enable this to be achieved in a simple to use and effective manner. As a result it is difficult to engage in collaborative design, development and review of scientific or technical computing projects. In addition, the results of any such collaborative computations are difficult to visualize and use by executives, policy-makers and other users.

The embodiments described below are not limited to implementations which solve any or all of the disadvantages of known distributed computing systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Distributed computing is described. In an embodiment a user drags and drops an icon representing specified functionality into a graph layout view of a distributed computing graph in order to control a distributed computing system. For example, the distributed computing graph controls currently executing processes in a distributed computing system. In an embodiment a dynamic mapping between the graph layout view and the distributed computing graph occurs such that the functionality of the icon is implemented. For example, the icon may represent a data bus connecting some of the currently executing processes and used to implement check pointing and/or caching mechanisms. In other examples the icon represents any of a spooler-player mechanism, debugging tools, multi-scale visualization tools, and data driven visualization tools.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
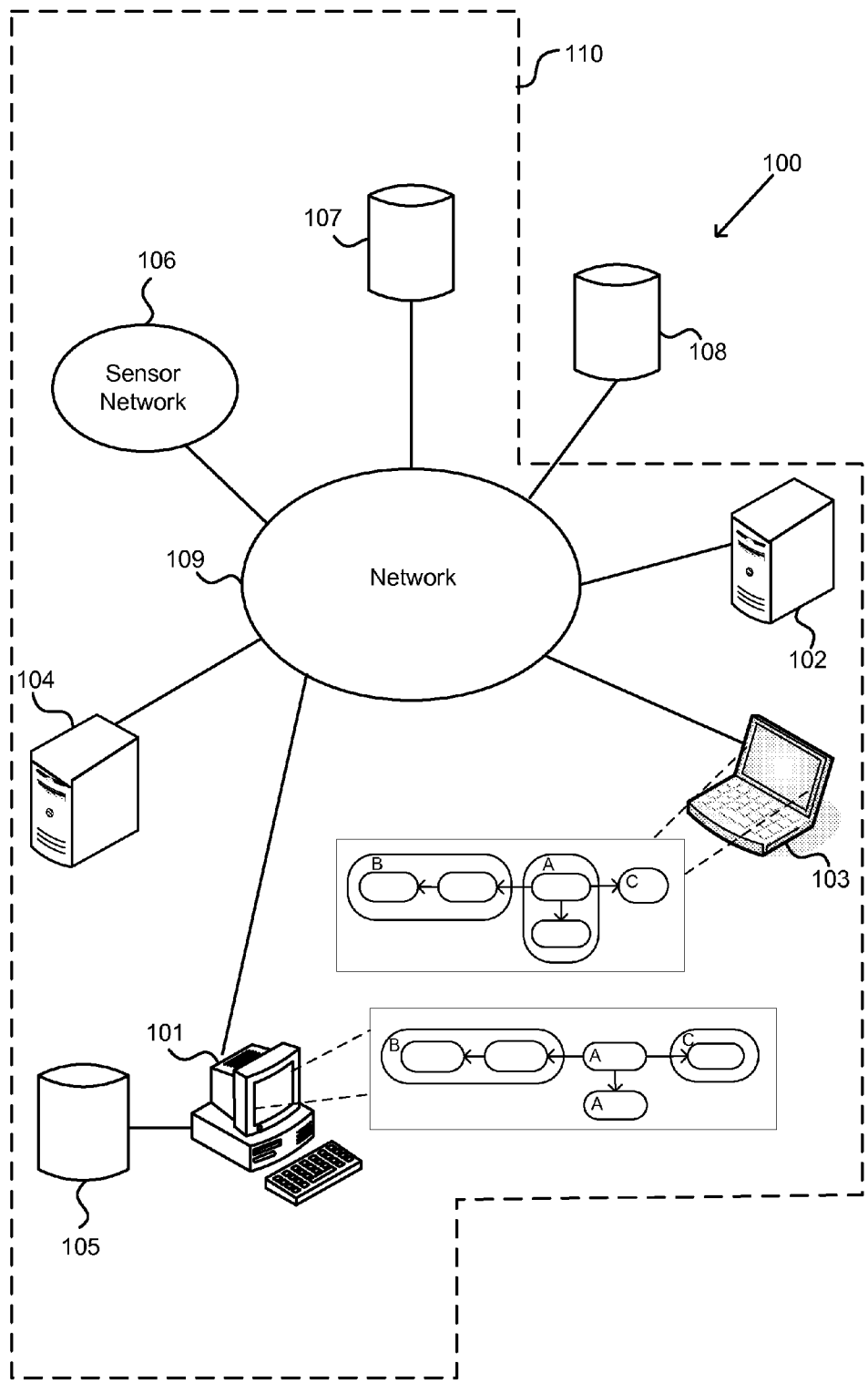
FIG. 1 is a schematic diagram of a distributed computing system.

FIG. 1 is a schematic diagram of a distributed computing system in which embodiments of the invention may be implemented. It comprises a network 109 which is any communications network which enables data to be transferred between entities 101-108 in that network. Many more entities may be present although FIG. 1 illustrates only 8 entities for clarity. An entity in the distributed computing system may comprise a physical processor such as personal computer, super computer or other processor (multi-core processor or single core). An entity in the distributed computing system may also be a logical construct such as a plurality of physical machines that appear to a user as one logical unit. It is also possible for an entity in the distributed computing system to be a virtual system such as a virtual personal computer or any other computing device. Some of the entities in the distributed computing system may provide access to data; for example, these may be databases 105, 107, 108 and/or may be sensor networks 106 which actively sense data. The distributed computing system may comprise one or more communities 110 which are groups of entities. Communities are described in more detail later in this document.

The entities in the distributed computing system are arranged to enable activities to be carried out in the distributed computing system under the control of one or more distributed computing graphs. An activity is one or more processes which are associated with an aim or objective. For example, the activity may be an experiment, a data centre management process, a computational computing objective or other group of processes associated with an objective. Each activity has an associated distributed computing graph which controls currently executing processes in the distributed computing system in order to carry out the activity. Entities in the distributed computing system are aware of the distributed computing graph and this is achieved in any suitable manner. For example, the distributed computing graph may be replicated at the entities. It is also possible for the distributed computing graph to be shared amongst the entities using a peer-to-peer distribution system of any suitable type. As described in more detail below, each entity has a graph layout view of the distributed computing graph and is aware of communication protocols, addresses and contracts associated with the processes assigned to the distributed computing graph.

The term "distributed computing graph" is used to refer to a data structure storing a plurality of nodes connected by links where each node represents a currently executing process at a specified entity in a distributed computing system. For example, the process may be a computational process which takes data from one or more sources (which could also be other processes) and produces output. It is also possible for the process to be one which retrieves data from a source and reformats or pre-processes that data so that it is suitable for a later computation process. In this case the data sourc(es) are specified at the node representing the process. Entities in the distributed computing system are arranged to carry out the represented processes (which may be parallel, concurrent or sequential) using the specified entities and data sources. Each distributed computing graph is associated with an activity as described above.

For example, one of the entities in the distributed computing system may be a PC 101 operated by an end user in order to participate in a collaborative computing activity with other entities. The PC may provide a graphical user interface which displays a graph layout view of a distributed computing graph as illustrated schematically in FIG. 1. The end user is able to edit the graph layout view of the distributed computing graph in order to carry out a type of programming activity. Changes that the end user makes to the graph layout view cause the underlying distributed computing graph to update and thus control the currently executing processes that form the activity. End users at other entities in the distributed computing system are also able to control those currently executing processes in a collaborative manner by using graph layout views at their respective entities.

End users are also able to view the outputs of an activity. For example, an entity in the distributed computing system may be a laptop computer 103 displaying data resulting from an activity as illustrated schematically in FIG. 1. Various views, viewports and user interface objects may be created and edited by an end user and associated with the distributed computing graph in order to achieve this. Those views, viewport and user interface objects are collectively referred to in this document as a visualization layer. All the entities in the distributed computing system are aware of the visualization layer in the same manner as for the distributed computing graph.

In an example, a data source such as a text file exists on a local machine operated by a user. The user is able to create or modify a graph layout view of a distributed computing graph using a user interface at an entity in the distributed computing system, such as PC 101. This is achieved by connecting a node representing the text file to one or more other nodes representing other entities in the distributed computing system and in this way a process is added to the graph. For example, these other entities may comprise a remote web service. The edge in the graph created between the text file node and the web service node may be implemented using a SOAP call to the web service to send the text file data to the web service for processing. However, this is not essential. Any suitable method of implementing the edge in the graph may be used. Another process may then be added to the graph layout view of the distributed computing graph. For example, this process may be a local executable file which is added as a node to the graph layout view by connecting it to the node representing the web service. This connection may be implemented using a SOAP call to the web service to pull the processed text file data from the web service. Another process may be created and a node representing it connected to the node representing the executable file. This newly added process may represent a file comprising the pulled data and is interpreted as a file by the distributed computing system. In this way a file system is effectively used to perform the process making use of remote web services. The file system and web service are examples only and may be substituted by any other suitable technology. For example, databases, custom executable files for computational processes, reading and writing to and from files.

Within the distributed computing system processes are able to notify each other. This is implemented using any suitable notification mechanism, for example, using push and pull notification mechanisms or publish and subscribe mechanisms. Once a process is completed, for example, the web service call is finished in the above example, a local representation of the process actively sends out (to all entities in the distributed computing system) a notification to indicate this using the particular notification mechanism being used.

Any suitable methods may be used to enable the processes and the local graph nodes to communicate. For example, an application programming interface is provided at each entity. This may be used by a programmer to link a process to a local graph item. For example, the application programming interface provides a set of contracts and communication mechanisms to be used by local representations of processes (in the graph layout views) to communicate with one another in the distributed computing system. In this way the graph layout view of a process may be thought of as a wrapper which enables a process to talk to one or more other graph items. Thus process events such as process notification, process error, process completion may be communicated to other graph items. Whether two processes are able to communicate may be specified by details in the wrappers.

Figure 2:
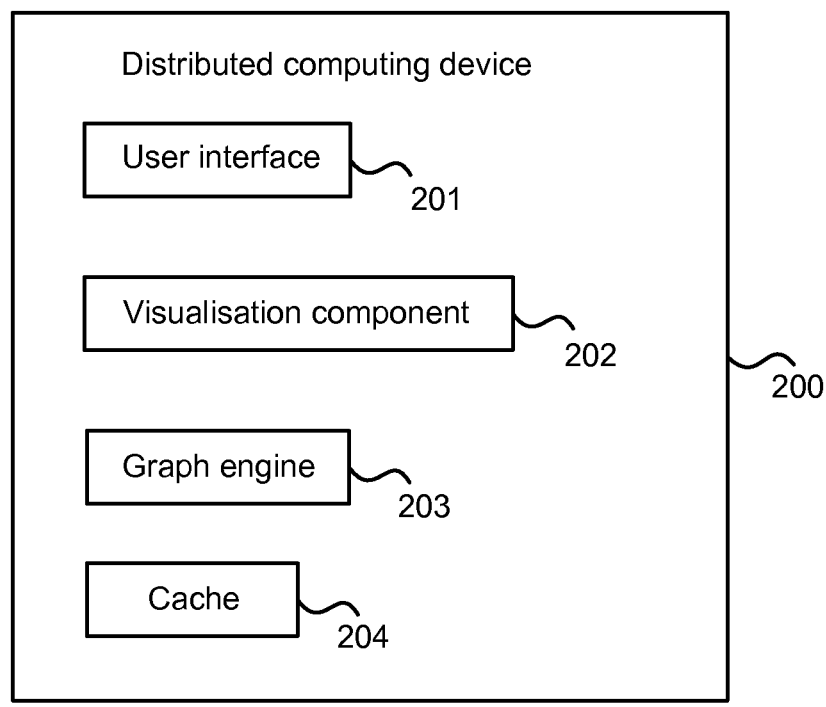
FIG. 2 is a schematic diagram of a computing-based device arranged to be part of a distributed computing system.

FIG. 2 is a schematic diagram of an entity in the distributed computing system 100 of FIG. 1 in more detail. The entity, such as PC 101 comprises a user interface 201; a graph engine 203, optionally a visualization component 202, and a cache 204. The user interface 201 provides a facility whereby a user is able to understand and/or control a computational computing activity implemented in the distributed computing system. The graph engine 203 is arranged to provide a dynamic mapping between a graph layout view of a distributed computing graph and the distributed computing graph itself. More detail about graph layout views is given below. The optional visualization component 202 is arranged to enable results of a computational computing activity to be presented at the user interface. The cache 204 is an optional data store arranged to store data produced by or during the activity.

Figure 3:
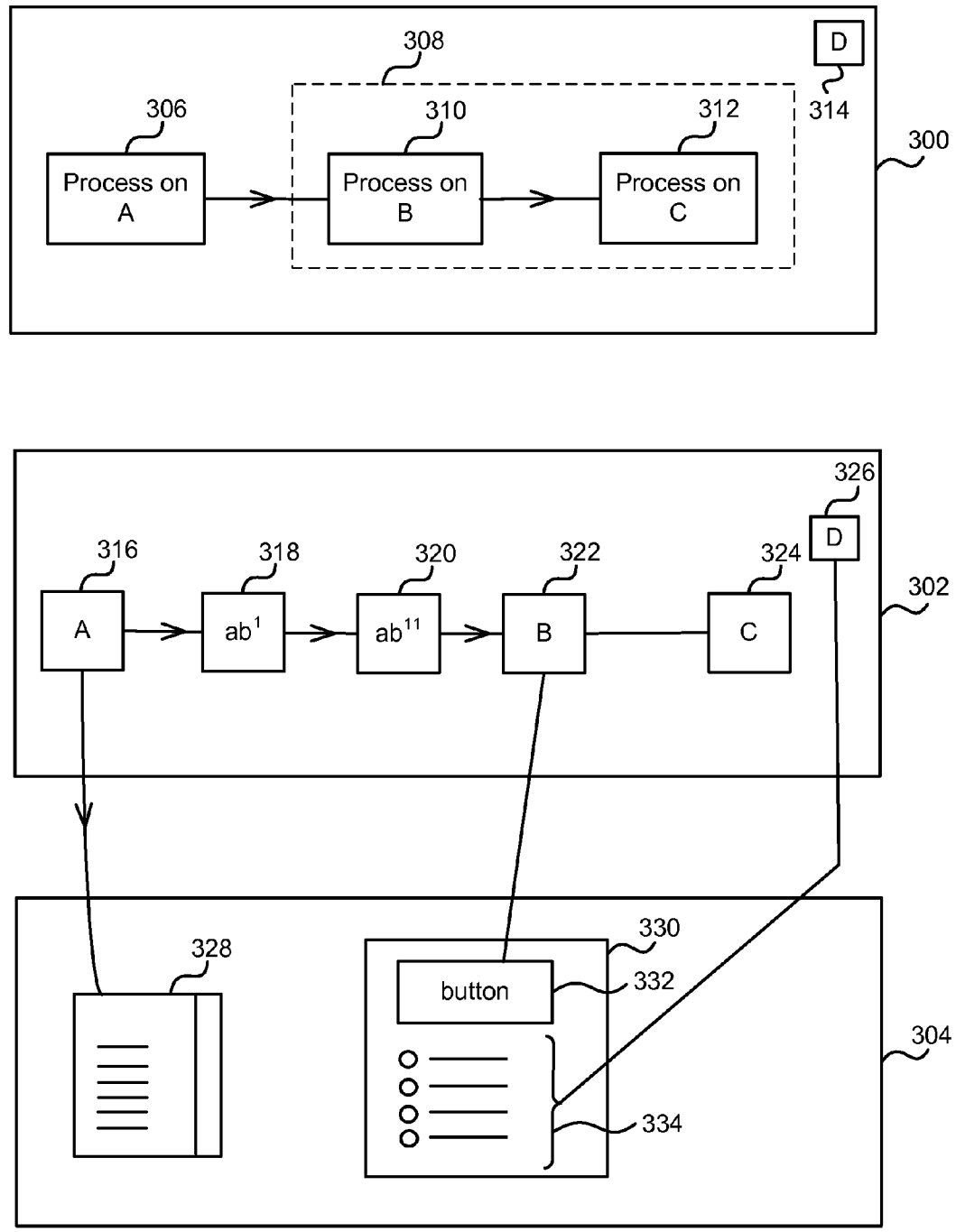
FIG. 3 is a schematic diagram of a distributed computing graph, a graph layout view of that distributed computing graph and of a visualization layer associated with the distributed computing graph.

FIG. 3 is a schematic diagram of a graph layout view of a distributed computing graph 300, a distributed computing graph 302 and a visualization layer 304. Together the graph layout view 300, the distributed computing graph 302 and the visualization layer 304 are referred to in this document as forming an experiment. The graph layout view may be stored as a document detailing the graphical items in the graph layout view, their positions and how they are connected. This may be referred to as the topography of the graph layout view. The graph layout view may be thought of as "source code" created by an end user and the document storing the graph layout view is a visual representation of that source code. The distributed computing graph 302 itself is not visible to the end user and may also be stored as a document as may the visualization layer 304.

The documents storing the graph layout view, distributed computing graph and visualization layer may be exported to various stand alone formats that can be run without the need for a graph engine. For example, distributed computing graph documents may be rendered directly to programming source code for use in creating desktop applications or web applications.

The graph layout view 300 of the distributed computing graph comprises nodes 306, 310, 312, 314 connected by links. At least some of the nodes represent processes carried out at specified entities in a distributed computing system. For example, node 306 represents a process carried out at machine A (for example this might be to retrieve data); node 310 represents a process carried out at machine B (for example, to carry out computations using the data from node A) and node 312 represent processes carried out at machine C of FIG. 1 (for example to carry out computations on the results provided by node B). Node 314 may represent processes to retrieve or format data from entity D. Nodes 310 and 312 may be in a community 308.

In embodiments a user is able to drag and drop icons into the graph layout view 300 of the distributed computing graph. These icons may be pre-configured and provided by the graph engine. The icons are a type of node and represent processes currently executing in the distributed computing system. Each icon has an associated specified functionality. For example, an icon representing a data bus may be a line which may be sized and shaped by a user to connect a plurality of nodes in the graph layout view. Other examples of icons include: spooler-player icons, multiplexer icons, debugging breakpoint icons, debugging inspector icons, and navigator icons. By inserting such icons into a graph layout view a user is able to create and implement the functionality represented by those icons in the distributed computing system in a simple and effective manner. The term "icon" is used to refer to a graphical item suitable for display at a graphical user interface and which represents functionality with which it is associated.

FIG. 3 also shows a distributed computing graph 302 corresponding to the graph layout view 300. It comprises nodes for each of the processes in the graph layout view. In this case, node 316 corresponds to node 306, node 322 corresponds to node 310, node 324 corresponds to node 312 and node 326 corresponds to node 314. One or more intermediaries 318, 320 may be present in the distributed computing graph which are not visible in the graph layout view. For example, these may be intermediaries which are automatically inserted by a graph engine 203 in order to reformat data and or adapt communications formats or protocols where required in order to allow processes to inter-work.

A visualization layer 304 is illustrated in FIG. 3. This layer is optional and enables a display of outputs from an activity to be easily created and managed. The visualization layer may comprise any combination of views, view ports and user interface objects. For example, these views, view ports and user interface objects are connected to nodes in the distributed computing graph using a suitable application programming interface. This enables data output from the processes represented by the nodes of the distributed computing graph to be directly provided to the visualization layer. For example, FIG. 3 shows a web page 328 displaying data from process A 316 of the distributed computing graph. It also shows a graphical user interface display 330 comprising a button 332 that may be activated or deactivated depending on data output from process B 322 of the distributed computing graph. A ranked list of documents 334 may also be presented at this graphical user interface display 330 using output from process D 326 of the distributed computing graph.

Entities in the distributed computing system have access to the distributed computing graph and form their own graph layout views of this graph. Also, each participant in an activity has access to the associated distributed computing graph even if that participant does not host any parts of that activity. The graph layout views are dynamically updated in order that they correspond to the distributed computing graph in the event that any changes occur in the distributed computing graph. Also, if a change is made at a graph layout view of the distributed computing graph this change is dynamically updated in the distributed computing graph itself and so is updated in graph layout views at each of the entities in the distributed computing system. That is, each graph layout view always reflects changes made by others in the distributed computing system.

As mentioned above, each participant in an activity has access to the associated distributed computing graph even if that participant does not host any parts of that activity. For example, a participant may require only to view the output of an experiment. In this case the participant connects to the distributed computing graph concerned but does not provide any input data, storage, processing capabilities or other resources for sharing.

Figure 4:
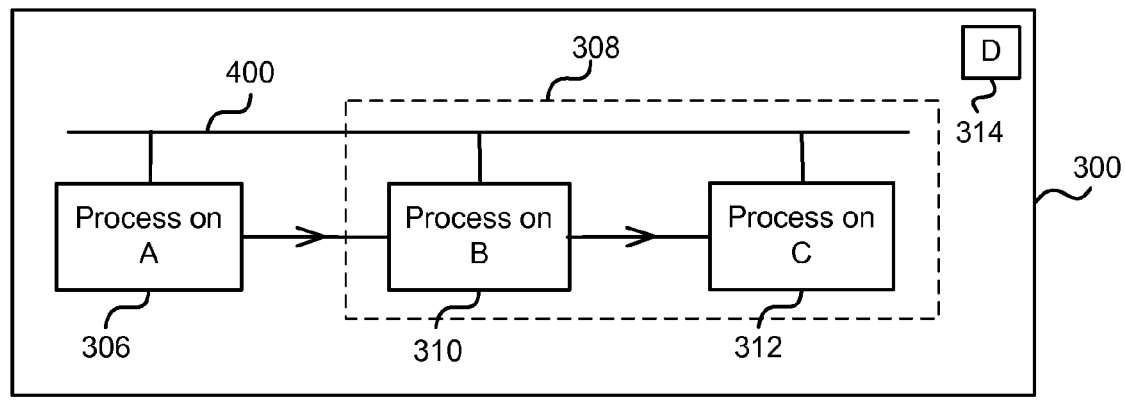
FIG. 4 is a schematic diagram of part of a graph layout view of a distributed computing graph showing a bus.

When a user edits or creates the graph layout view of the distributed computing graph he or she is able to add a bus 400 as illustrated in FIG. 4 which shows part of a distributed computing graph. In the example of FIG. 4 three nodes are shown in the distributed computing graph connected along bus 400. By drawing a bus on the graph layout view of the distributed computing graph the user is able to specify how data is to be shared between the nodes on the bus. The nodes on the bus represent processes which may either write data to the bus, read data from the bus or both read and write data to the bus. For example, the bus enables the user to specify that functionality of a two-way data connection be provided between the processes such that anything a writer puts onto the bus can be read by all readers and all reader/writers simultaneously.

In order to enable the bus functionality to be implemented a graph engine at the user's machine dynamically updates the distributed computing graph shared in the distributed computing system. This update process comprises adding any connections or inserting intermediaries in order to implement the bus functionality.

Optionally, the dynamic update process may also implement a check pointing mechanism using the bus. This is achieved by adding one or more data stores at automatically selected locations in the distributed computing graph and configuring those to store data written to the bus at specified intervals. The graph engine has access to rules or other criteria to enable it to automatically select appropriate locations for the data stores in the distributed computing graph and find and use appropriate data stores in the distributed computing system. For example, for the portion of a bus segment that connects components that all execute on a single computer, a single checkpoint data store can be created on the local disk drive. For busses which transect two or more computers, one checkpoint dataset may be created on the local disk storage system of each computer. The timing of checkpoint writes to the checkpoint data store may be determined heuristically based on the rate of change of data on the bus (which is monitored) along with user-provided preferences. For instance, for processes where computation is very costly (meaning that repeating the computation would require much time or the use of computer resources that incur monetary expense) the user might choose to request more frequent checkpoints, however, for very large volumes of data that can be cheaply and quickly reproduced, the user might request few or no checkpoints on that data bus.

Figure 5:
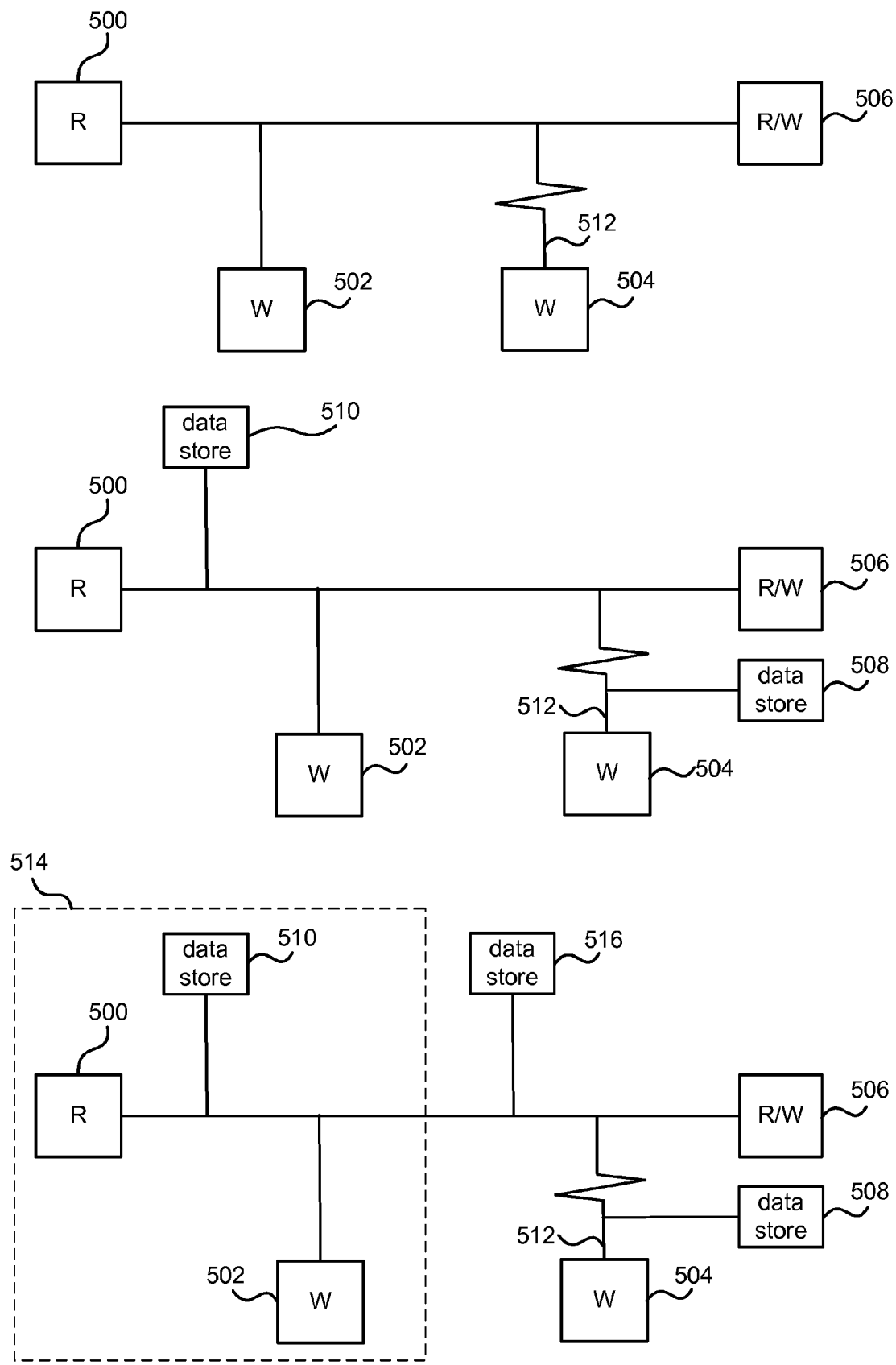
FIG. 5 is a schematic diagram of an example of a bus as part of a distributed computing graph.

FIG. 5 shows part of a distributed computing graph comprising a bus connecting a plurality of processes which are: a reader 500, a writer 502, a reader/writer 506 and a second writer 504. The second writer 504 is connected to the bus using different hardware as indicated by symbol 512 such that there is a latency in data written from writer 504 to the bus.

The graph engine automatically inserts data stores 508, 510 on the bus at locations it selects (as shown in the middle part of FIG. 5). For example, data store 510 is able to store data written to the bus by writer 502 and data store 508 is able to store data written to the bus by writer 504. Data may be written to the data stores 508, 510 from the bus at specified intervals. In this way if a process connected to the bus fails or stops for any reason then when that process resumes it is possible to recover the activity of the distributed computing graph by using the data from the data stores. Also, by using data store 508 the latency introduced by the different hardware connecting writer 504 to the bus can be accommodated.

In other examples more than one data store may store duplicate data from the bus. For example, in the case that the bus crosses a community boundary 514 as illustrated in the bottom part of FIG. 5. In this example, reader 500 and writer 502 are members of a community 514 but the remainder of the bus is not. Suppose that a process leading to the writer 502 is computationally very expensive and is carried out using a cluster of high performance computers. The reader/writer 506 may be at a home PC which is turned off at night. The user of the home PC may wish to make use of the cluster of high performance computers at night and is able to do so by using data store 516.

In another example, a visualization layer document is opened by a user for the first time. At this stage the currently executing processes represented by the distributed computing graph produce outputs and data is written to data stores on the bus as described above. The data is displayed at the visualization layer document associated with the distributed computing graph. When the user closes the visualization layer document the currently executing processes proceed in the background. Later the user re-opens the visualization layer document. It is then able to use data from the data stores unless the graph engine indicates that this data needs to be re-computed.

Figure 6:
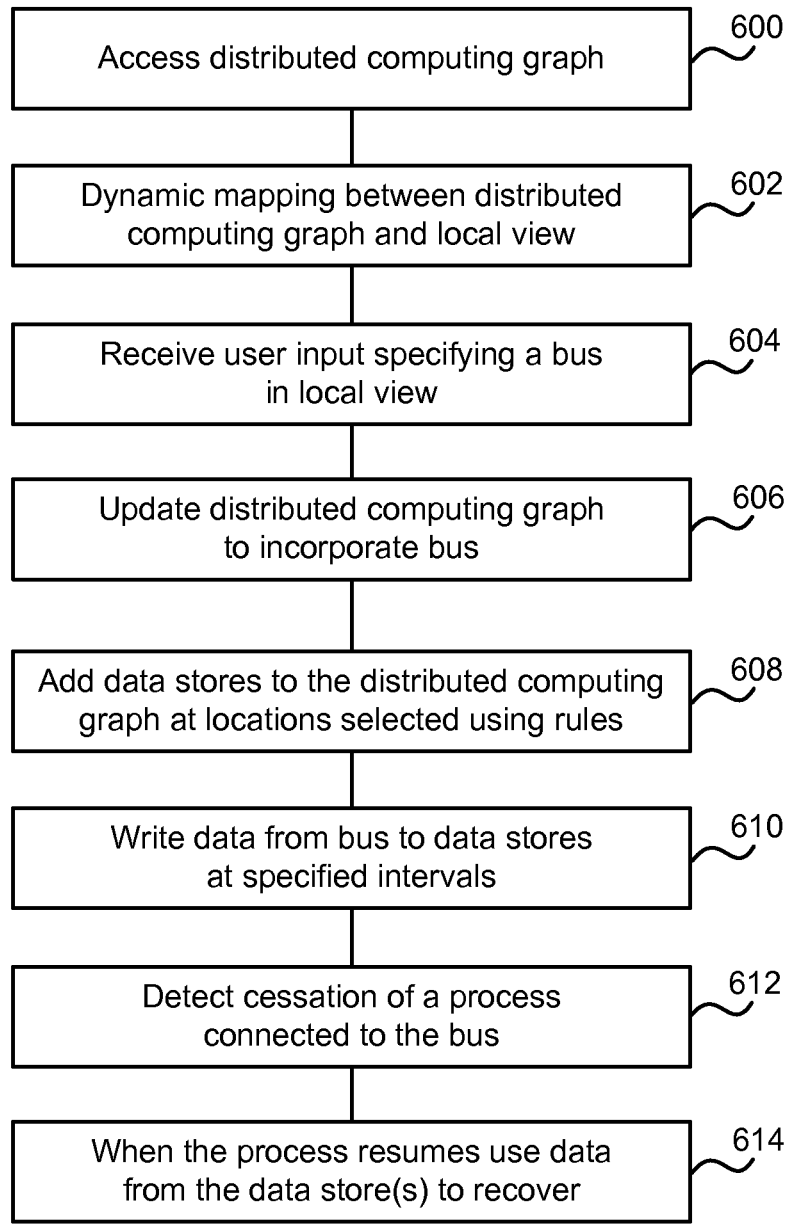
FIG. 6 is a flow diagram of a method of check pointing at an entity in a distributed computing system.

FIG. 6 is a flow diagram of a method at an entity in a distributed computing system for implementing a bus and using it for check pointing. The graph engine accesses 600 a distributed computing graph as described above and carries out a dynamic mapping 602 between that distributed computing graph and a graph layout view of the distributed computing graph. User input is received 604 specifying a bus in the graph layout view and the distributed computing graph is updated 606 to incorporate that bus. Data stores are added 608 to the distributed computing graph at locations selected by a graph engine using rules or other criteria. Data is written from the bus to the data stores at specified intervals. The intervals may be configured by a programmer who edits the graph layout view, may be preconfigured, or may be automatically selected by the graph engine. If the graph engine detects cessation 612 of a process connected to the bus (for example, if a computer or program crashes) then when that process resumes the graph engine uses 614 data from the data stores to recover. This enables a robust distributed computing system to be provided.

Figure 7:
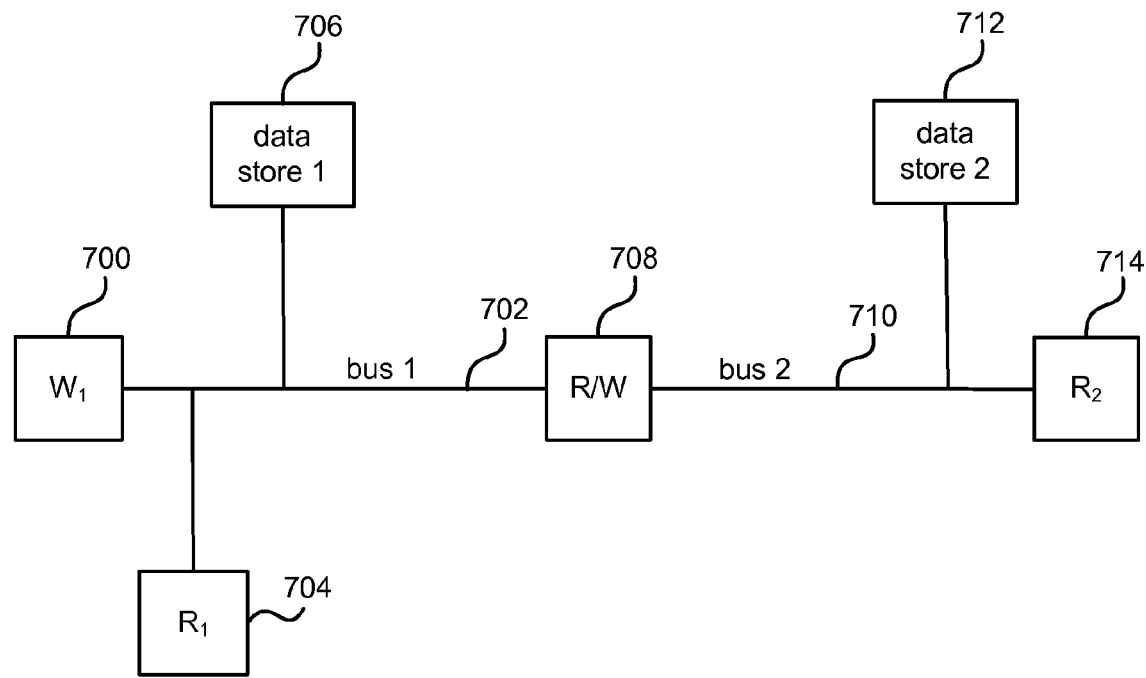
FIG. 7 is a schematic diagram of another example of a bus as part of a distributed computing graph.

The bus mechanisms described above may also be used for caching. In this case data from the data stores is used once checks have been made to find out whether that data may be relied upon or whether the computations that produced that data need to be re-run. This improves computational efficiency and robustness since it is not necessary to re-compute data in many situations. For example, FIG. 7 illustrates two buses 702, 710 as part of a distributed computing graph. A first one of the two buses connects a writer W1 700, reader R1 704 and reader/writer 708. The second bus 710 connects reader writer 708, and reader R2 714. The graph engine has automatically inserted two data stores 706 and 712 to the distributed computing graph as described above.

The process which produces the data written to the bus by writer W1 may be very computationally expensive and may be expected to take around one week to complete. The data written onto bus 1 702 may be written to data store 1 706 every 10 minutes. A check pointing mechanism may then be used as described above so that if the computationally expensive process fails and later resumes the overall activity can be picked up again using the data from data store 1 706. However, suppose that the feeds to the process that leads to writer W1 change. For example, this may be a result of a change in the graph layout view and hence the distributed computing graph. It may also be because of a change in the behavior of the feed itself. For example, suppose that the feed is from a sensor network which monitors temperature. The monitored temperature may have been fluctuating about a relatively steady average temperature but then may change significantly and fluctuate about a new, much higher average temperature. In this case the data from the data store may not be an accurate reflection of the current sensor network data. A graph engine at one or more entities in the distributed computing system is able to detect when feeds to a process change using the distributed computing graph. It uses this information to decide whether data from a particular data store may be relied upon or needs to be recomputed.

Figure 8:
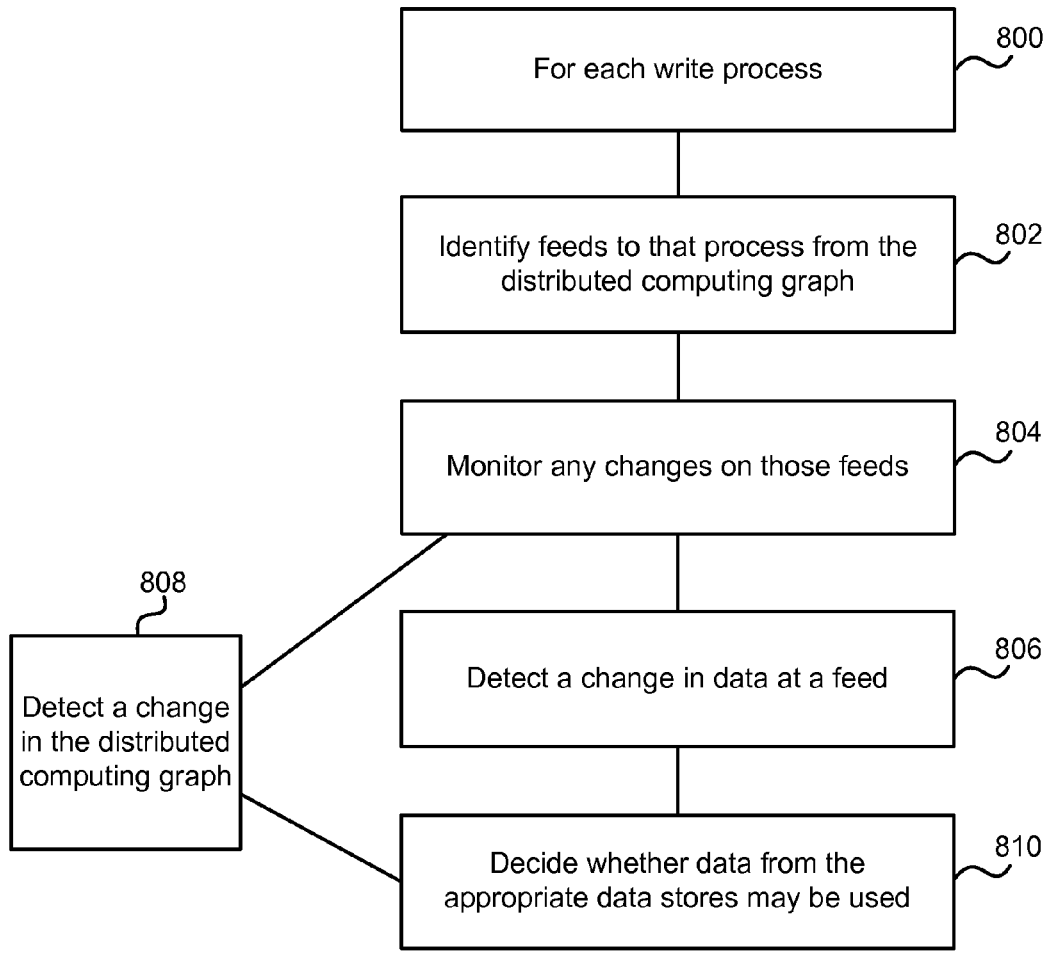
FIG. 8 is a flow diagram of a method of caching at an entity in a distributed computing system.

FIG. 8 is a flow diagram of a method of caching at an entity in a distributed computing system. For each write process 800 on a bus at a distributed computing graph a graph engine identifies 802 feeds to that process from the distributed computing graph. It monitors 804 any changes on those feeds. For example, it detects a change in the distributed computing graph 808 which results in a change to an input to the process concerned. In another example, it detects 806 a change in data at one of the feeds. If a change is monitored or detected the graph engine decides 810 whether data from the appropriate data stores may be used.

In practice, the rate of a calculation at a process in the distributed computing graph rarely matches or exceeds the rate at which it is required to view the results of that calculation. Information may need to be updated at a user interface display several times per second, but requires minutes, hours or days to calculate. In order to address this data stores may be used as described above to store calculation results in readiness for later display. In addition, spooler-player mechanisms may be used to decouple rate-of-calculation from rate-of-visualization as now described.

When a user creates or edits a graph layout view of a distributed computing graph, he or she is able to drag and drop a spooler-player icon into the graph layout view. A graph engine at the entity providing the graph layout view detects the added spooler-player icon and updates the underlying distributed computing graph such that a spooler-player process is added. This is achieved as a result of the dynamic mapping between the graph layout view and the distributed computing graph.

Figure 9:
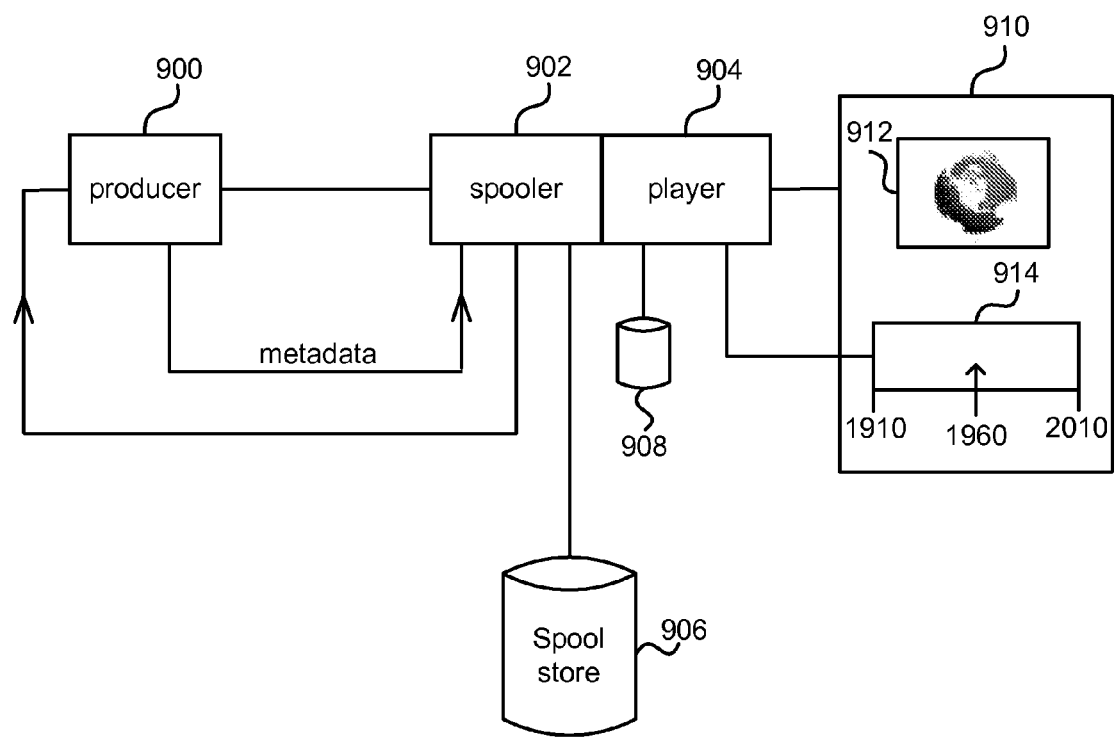
FIG. 9 shows part of a distributed computing graph incorporating a spooler player mechanism.

FIG. 9 is a schematic diagram of part of a distributed computing graph comprising a spooler-player process 902, 904 and also showing part of a visualization layer 910 linked to the distributed computing graph. The distributed computing graph comprises a producer 900 which writes data to the spooler process 902 and which also provides metadata to the spooler process 902. The spooler process is able to provided feedback to the producer 900 as illustrated. The spooler process 902 is connected to a spool store 906 which may be any suitable data store and which may be automatically inserted to the distributed computing graph by a graph engine when the spooler-player process is implemented. A player process 904 is integral with the spooler process 902 and is connected to a data store 908. Outputs from the player process 904 are provided to the visualization layer 910. For example, the producer 900 may be a process which outputs triplets of data values comprising a latitude, a longitude and a temperature value. In this case the metadata may be a description of the data as triplets of such values. The player may output the data to a graphical display of the planet 912 which illustrates the temperatures at geographical locations on the planet. The visualization layer may also comprise a user input device 914 such as a slider which enables a user to select parameter values or ranges over which the user would like to see displayed data from the player. In the example shown in FIG. 9 a slider 914 enables a user to select a year or other time for which data is to be displayed.

Figure 10:
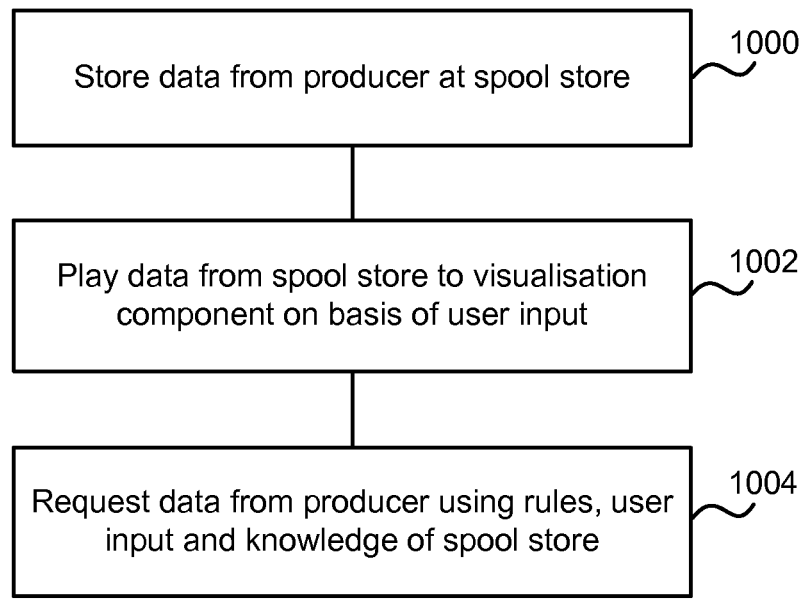
FIG. 10 is a flow diagram of a method at a spooler-player process.

With reference to FIG. 10 a graph engine is arranged to update a distributed computing graph in order to provide a spooler-player process with the following functionality. The spooler process 902 is arranged to store 1000 data from a producer process to which it is connected at a spool store. That data may be stored using representations selected on the basis of metadata provided to the spooler process 902 from the producer process 900. A player process is arranged to play 1002 data from the spool store to a visualization layer 910 on the basis of user input. That user input may be received at the visualization layer 910. The spooler process 902 is also able to request 1004 data from the producer on the basis of user input, rules or other criteria and knowledge of the spool store. The knowledge about the spool store, such as the range of data held in the spool store, the capacity of the spool store, may be stored at data store 908.

For example, suppose that slider 914 is set at year 1960. Suppose that data from 1959 to 1961 is currently in the spool store. The player process 904 plays data for the year 1960 from the spool store to the visualization layer. If the user moves the slider to the year 1990 the player process 904 is able to access data store 908 and determine that data for that year is not available in the spool store 906. The spooler process 902 requests the data for year 1990 from the producer 900. The spooler process 902 uses rules or other criteria to intelligently sequence its requests for data from the producer 900. For example, when seeking data for a particular date range the data for the mid point of the range may be requested first, followed by data for dates either side of the mid point beginning closest to the mid point and working away from the mid point towards the limits of the date range. In another example, the spooler process may sequence its requests for data so that data points for times more recent than the currently displayed data point are requested before data points for times prior to the currently displayed data point. This is beneficial for applications where users are likely to require more recent data values.

Figure 11:
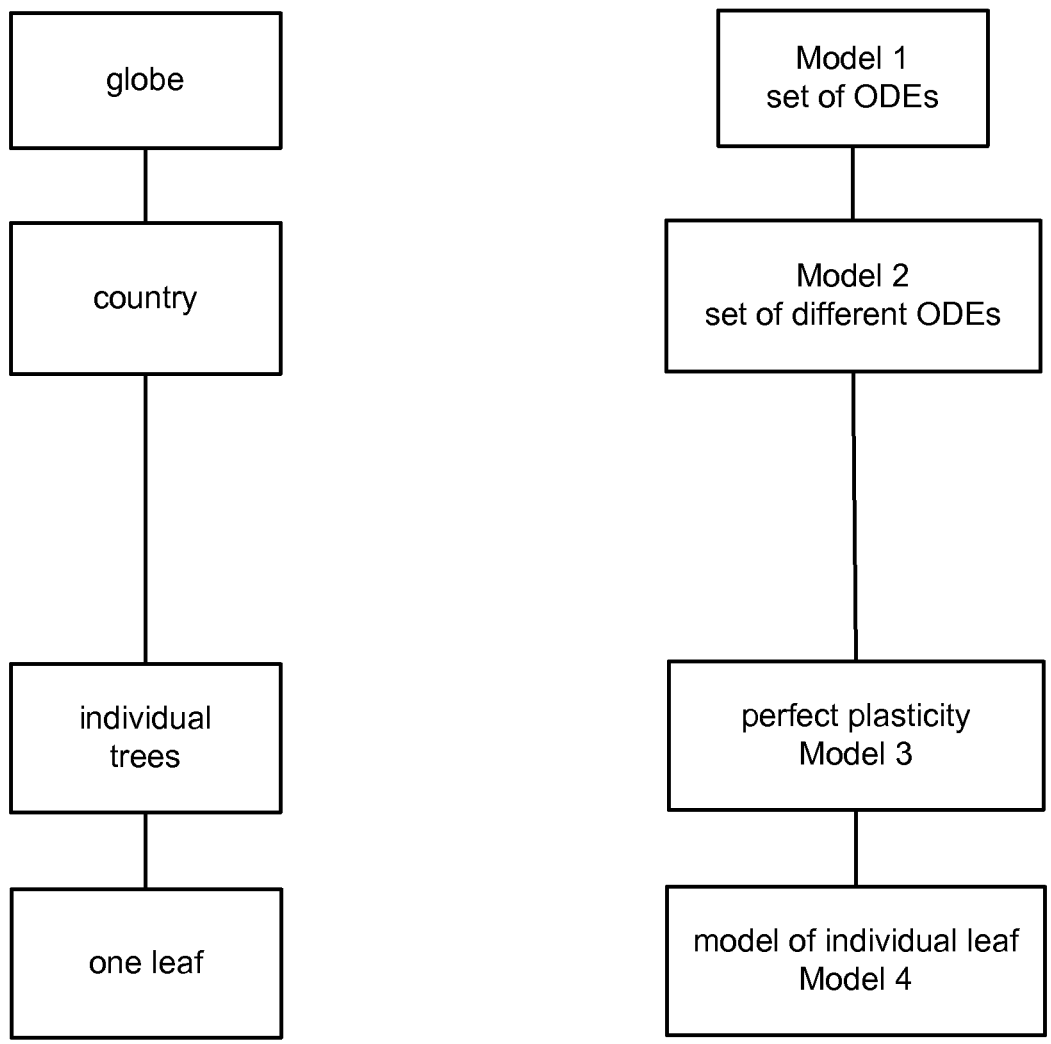
FIG. 11 illustrates a plurality of models for analyzing data at different scales.

Data can typically be analyzed at a multitude of different scales each suited to different tasks or decision processes. For example, the same data stream may be analyzed using a plurality of different models each suited to a different scale. For example, FIG. 11 illustrates a plurality of different scales for analyzing forest data: a planetary or globe level, a country level, an individual tree level and an individual leaf level. Different models may be available for each of these different scales and these are illustrated as models 1 to 4 in FIG. 11. For example, model 1 may be a set of ordinary differential equations (ODEs). Model 2 may be a different set of ODEs which is more expensive to run. Model 3 may be a perfect plasticity model and model 4 may be an individual leaf model.

Figure 12:
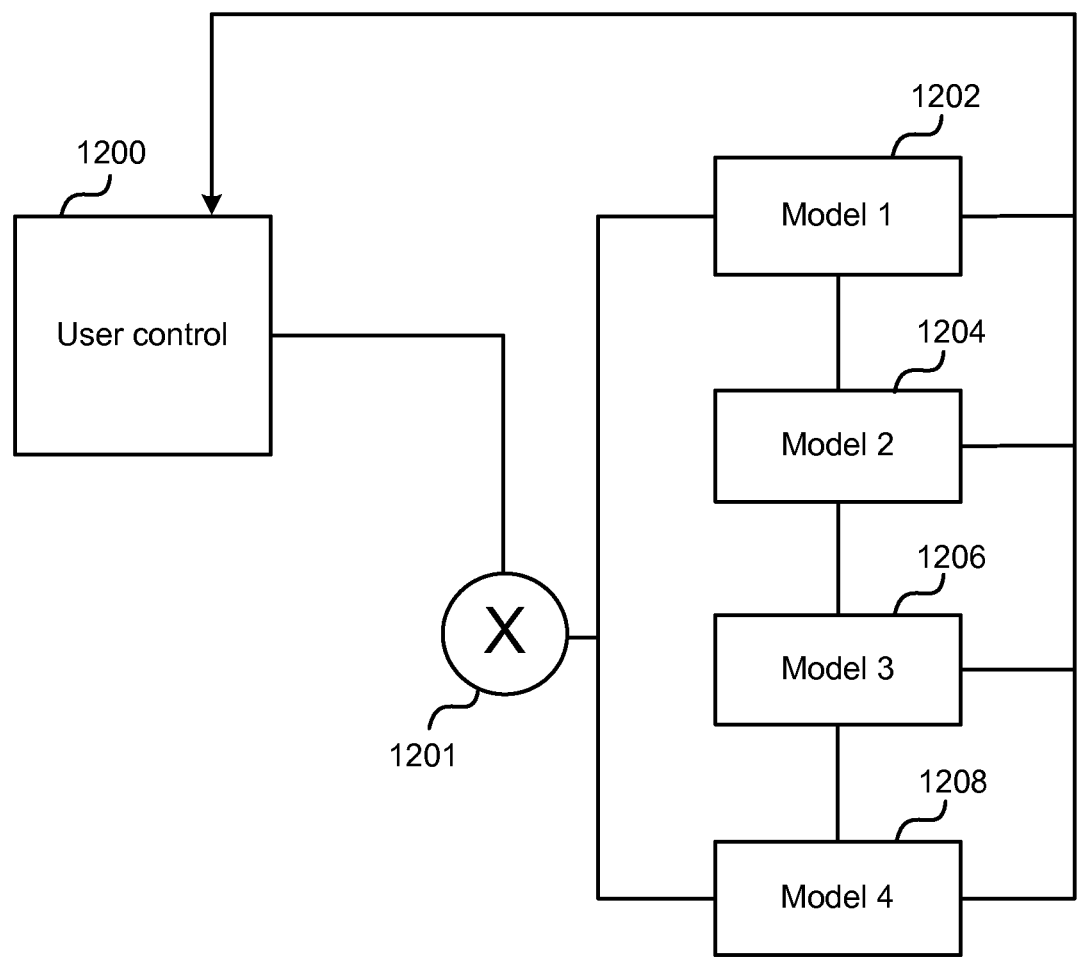
FIG. 12 is a schematic diagram of a multiplexer process as part of a distributed computing graph.

If a distributed computing system is arranged to implement an activity as described herein it may comprise a distributed computing graph controlling a plurality of currently executing processes. Those processes may each be suited to a different scale of data analysis, for example, by implementing models 1 to 4 of FIG. 11. In that case the distributed computing graph may comprise a multiplex node 1201 as illustrated in FIG. 12. For example, a programmer may drag and drop a multiplex icon into a graph layout view of the distributed computing graph. A dynamic update process occurs as described above and a multiplex mechanism is created automatically in the distributed computing graph by a graph engine at the distributed computing entity used by the programmer A visualization layer may comprise a user control 1200 as part of a user interface. This user control 1200 is associated with the multiplex mechanism in the distributed computing graph by a programmer, using a suitable application programming interface. Each of the models is a currently executing process in the distributed computing system. The user control 1200 enables a user to specify which of the models is to be selected to provide output to the visualization layer. In this way an end user is able to view live outputs from the different currently executing models in a simple and effective manner.

As described above, a distributed computing graph controls currently executing processes in a distributed computing system. As a result it is difficult for a programmer or controller of an activity to debug potential errors in a distributed computing graph because all the processes are always running and cannot be stopped for debugging purposes. To assist with debugging a graph engine is arranged to detect break points added to a graph layout view of a distributed computing graph. This break point is automatically implemented by the graph engine by inserting one or more buffers in the distributed computing graph. This is now described with reference to FIGS. 13 and 14.

Figure 13:
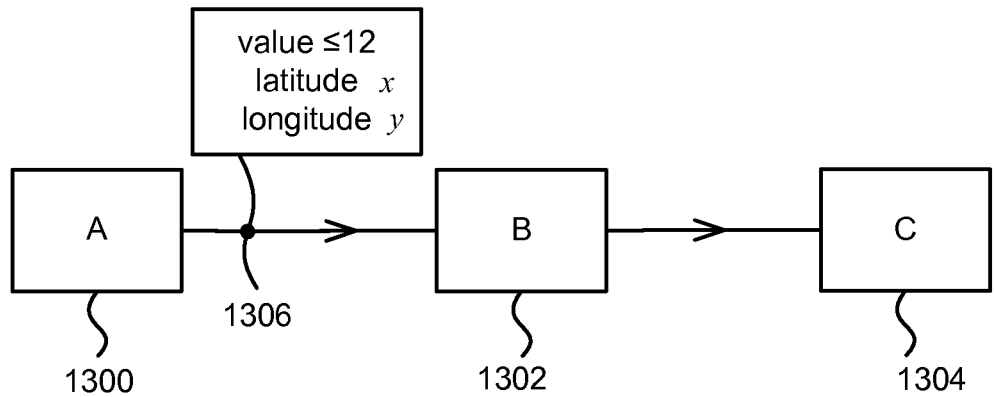
FIG. 13 shows part of a distributed computing graph and an associated graph layout view of that distributed computing graph, with a debugging breakpoint added.
Figure 13:
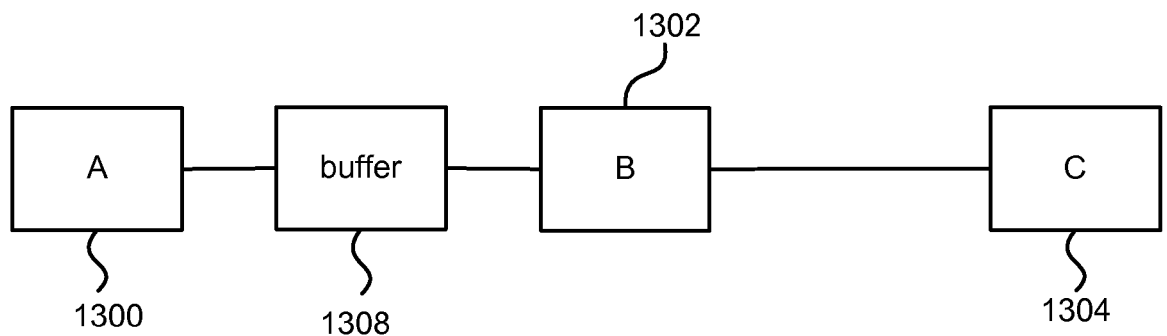
Figure 14:
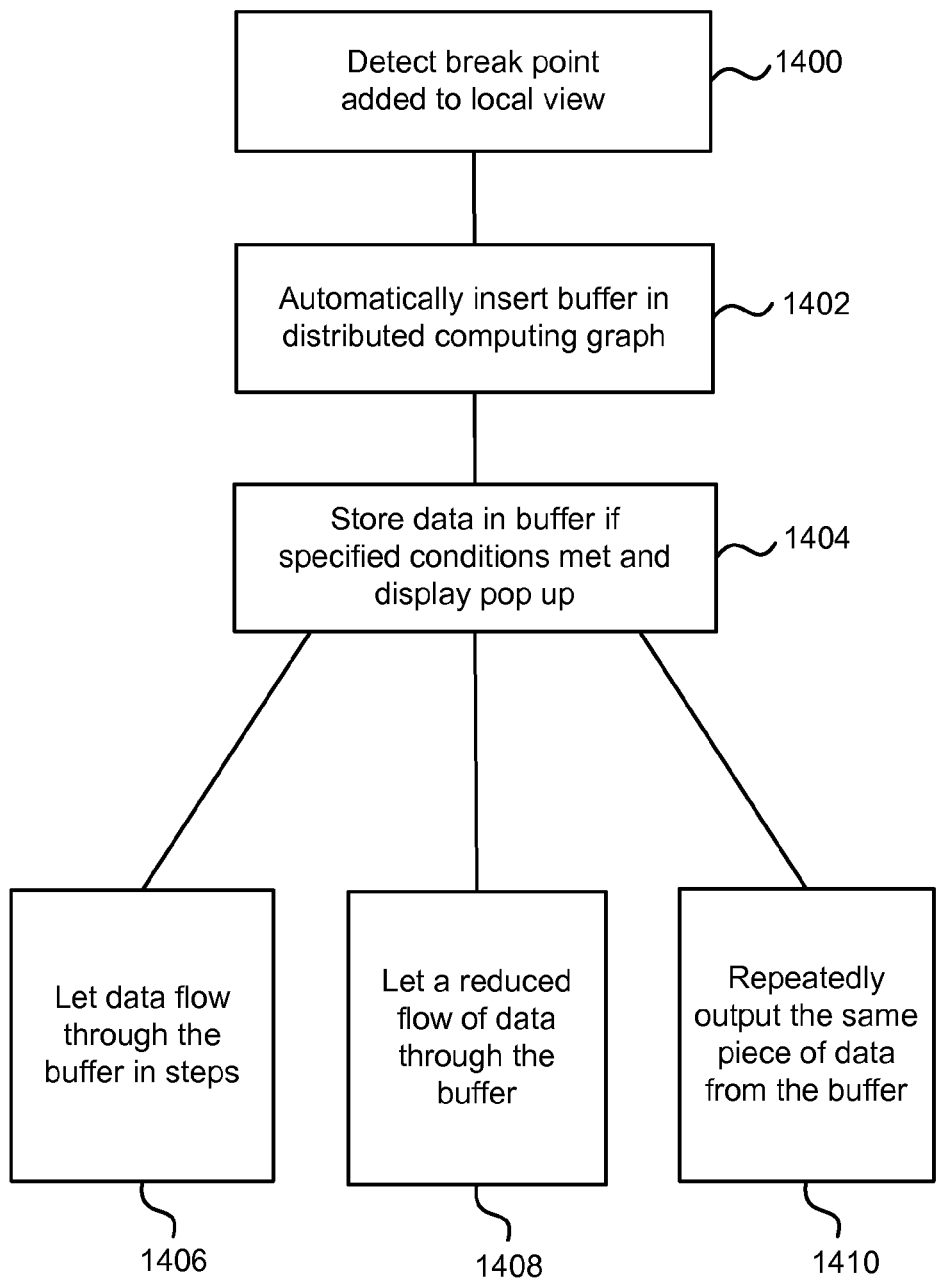
FIG. 14 is a flow diagram of a method at a graph engine of implementing a debugging breakpoint.
Figure 15:
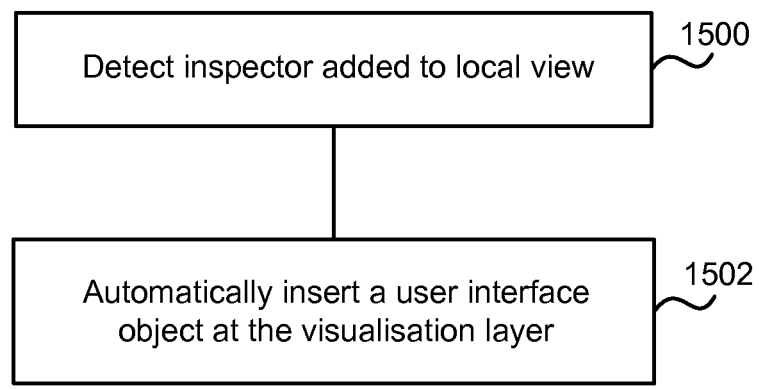
FIG. 15 is a flow diagram of a method at a graph engine of implementing a debugging inspector.

The upper part of FIG. 13 shows part of a graph layout view of a distributed computing graph. It comprises nodes representing processes A 1300, B 1302 and C 1304 where process A outputs data to process B which in turn outputs data to process C. A user places a break point 1306 between nodes A and B as illustrated and sets parameter values for that break point. For example, those parameter values may be latitude x, longitude y and data value≤12. The corresponding part of a distributed computing graph is illustrated in the bottom part of FIG. 13 and shows buffer 1308 added between process A and process B.

The graph engine detects 1400 a break point added to the graph layout view. The break point has associated conditions specified by a programmer. The graph engine automatically inserts 1402 a buffer in the distributed computing graph. The buffer is arranged to automatically store data if the specified conditions are met and optionally to display a pop up at a user interface in that event. The buffer may be arranged to let data flow 1406 through the buffer in steps. The buffer may also be arranged to let a reduced flow 1408 of data through. In another example the buffer may be arranged to repeatedly output 1410 the same piece of data.

In another example, a programmer is able to add an inspector icon to a graph layout view. The programmer may input one or more criteria with the inspector icon. A graph engine detects 1500 the added inspector and automatically inserts 1502 a user interface object at a corresponding visualization layer in order to display data output from a process adjacent to the inspector icon. The user interface object may be configured to take into account the criteria provided with the inspector icon. For example, the data output from a process may comprise (latitude, longitude, temperature) triplets. The criteria may be to only display latitude values.

Previously dedicated applications have been provided to write computer programs and separate dedicated applications have been provided to write text documents and create visual displays of data such as slide packs, charts and graphs. In order to display data calculated by a computer program it has previously been possible to pre-compute the data using the computer program and then copy and paste that data into another application to create slide packs, charts, graphs, and the like. The data in the slide packs and other documents is then static and quickly becomes out of date or not relevant as time goes by.

In embodiments described herein a visualization layer may be provided in a manner which enables a dynamic link to be maintained between data calculated by one or more processes and visual displays, documents, decision-maker dashboards, and/or user interfaces. For example, a visualization layer may comprise a plurality of web pages or slides in a presentation document. The order or sequence in which those web pages or slides are to be presented may be varied dynamically according to data output from one or more computational processes controlled by a distributed computing graph.

Figure 16:
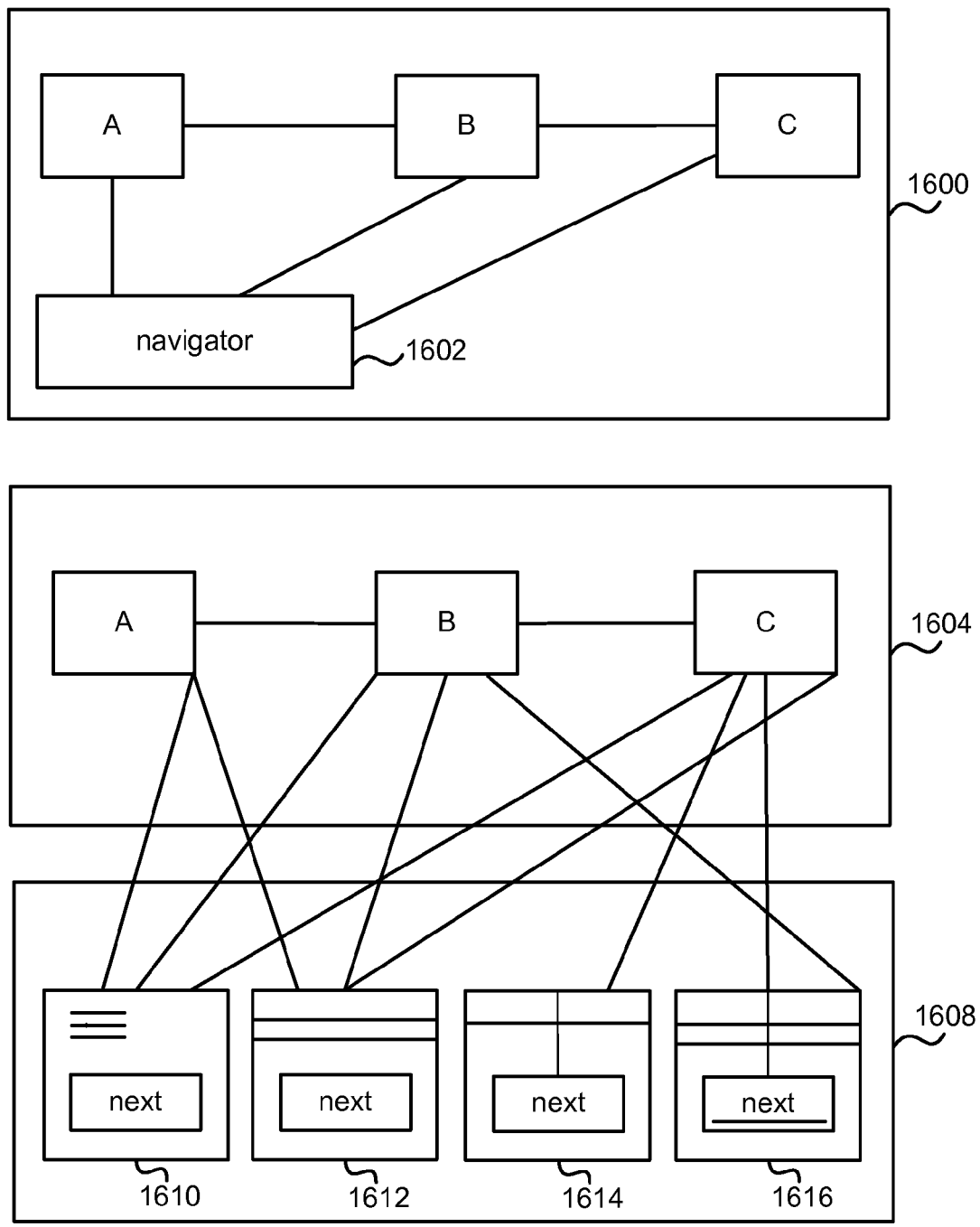
FIG. 16 is a schematic diagram of a graph layout view incorporating a navigator icon and also showing an associated distributed computing graph and visualization layer.
Figure 17:
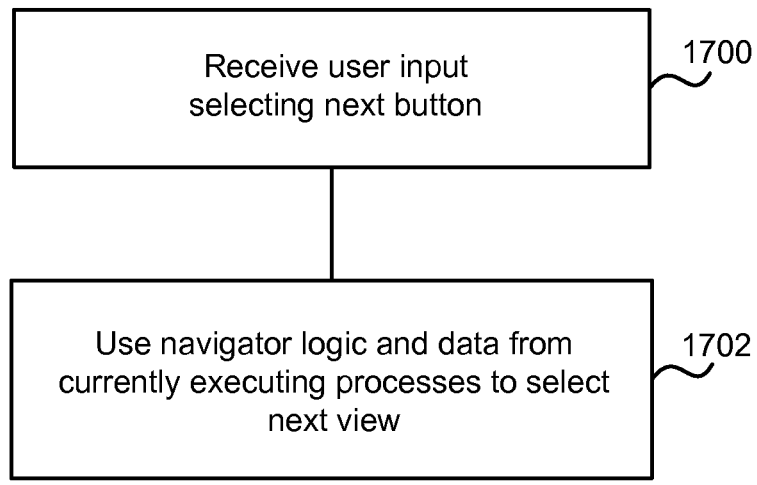
FIG. 17 is a flow diagram of a method at a visualization layer of using a navigator logic.

For example, a user or programmer is able to drag and drop a navigator icon 1602 (or other data-driven navigation tool) into a graph layout view 1600 as illustrated in FIG. 16. In this example the navigator icon 1602 is connected to each of three processes A, B and C. A distributed computing graph 1604 associated with the graph layout view 1600 is also illustrated. This controls currently executing processes A, B and C which produce data streams. The distributed computing graph comprises functionality for implementing the navigator logic associated with the navigator icon. This functionality is added to the distributed computing graph by a graph engine automatically as part of the dynamic mapping between the graph layout view and the distributed computing graph.

A visualization layer 1608 comprises four display items (such as slides or documents or user interface items or web pages) 1610, 1612, 1614, 1616. Those web pages are linked to one or more of the processes A, B, C as illustrated and dynamically display live data from the processes to which they are linked. Each display item comprises a next button or other user interface item which enables a user to move to a subsequent web page or display in a sequence of display items. However, the sequence of display items or web pages is not pre-specified but is rather dynamically determined using navigator logic and data from the currently executing processes A, B, C.

For example, a visualization layer 1608 may receive 1700 user input selecting a next button (or similar user interface device). Navigator logic at the distributed computing graph is used to select 1702 which web page (or slide or document or user interface item) to present next on the basis of data observed from one or more of the currently executing processes. In this way data streams from the currently executing processes are used to influence a user interface display, presentation document or decision-maker dashboard in a simple and effective manner. Thus data may be used to drive the flow of a slide presentation and/or aspects of a visualization.

In many cases processes in the distributed computing system run much longer than an individual user's laptop may be turned on for. For example, a user may start a computation that runs in a high performance computer community and then close his or her laptop. Later when the user starts up the laptop it is updated with the latest data from the ongoing computation.

Each part of a computation (each community participant) has its own graph engine which manages the local computation. Each participant has its own copy of the controlling document (the activity) for the ongoing computation. Computations are driven and controlled by the document, not by any one computer, so it is possible to start a computation by opening a document on one computer, and then open the same document on another computer and see the current data. In this way a decentralized document is provided to control a distributed or cloud computing system. Data may also be stored via the document, either in a local location that is replicated to other participants or in a shared well-known location (like a cloud store). These things all work together to create documents that appear to 'run' on the cloud and which appear to continue to run even when a user is not actively watching/controlling them. Documents may stop computing when they have either reached their cache limits or when the calculations naturally wind down.

Figure 18:
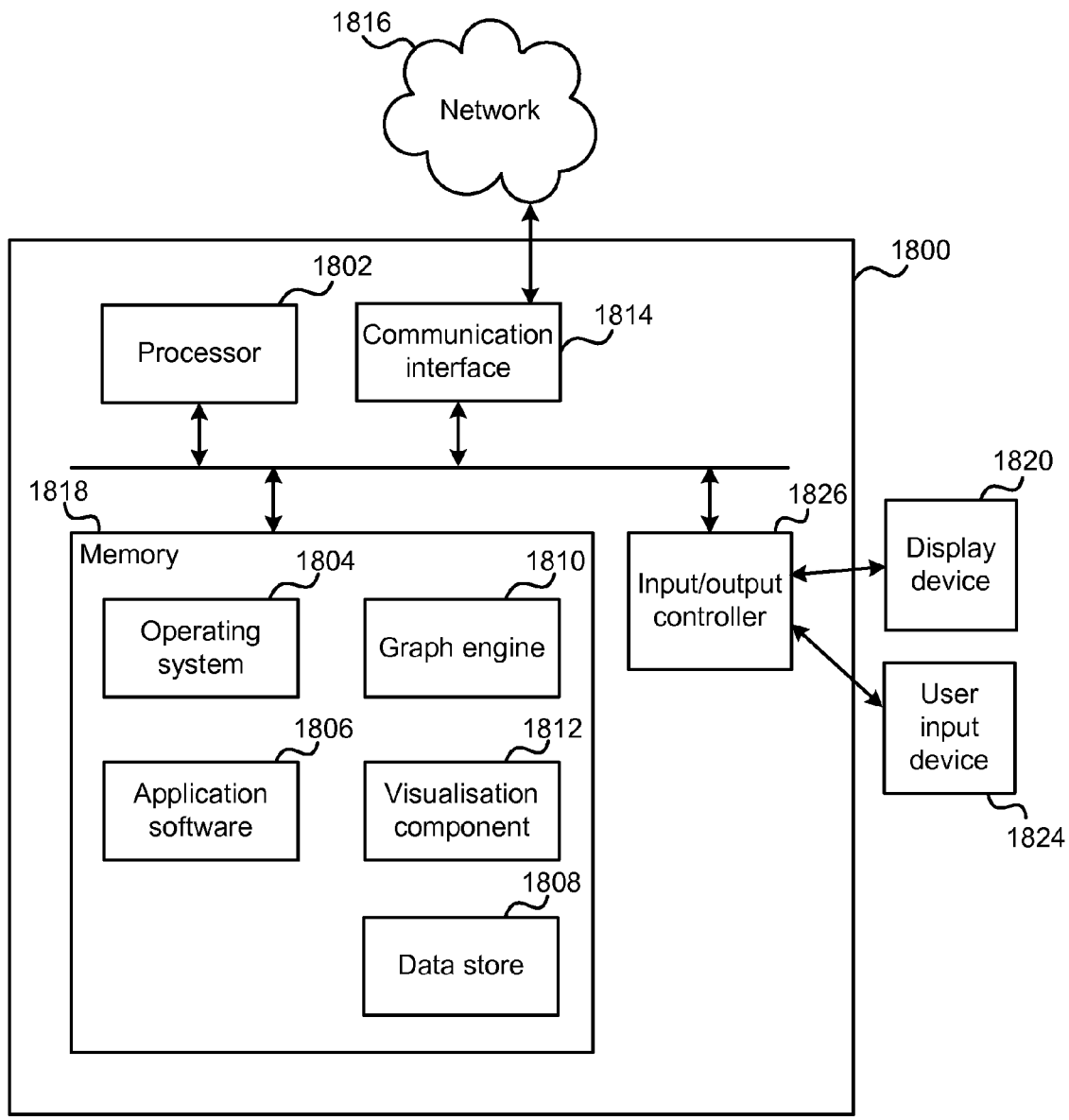
FIG. 18 illustrates an exemplary computing-based device in which embodiments of a graph engine and/or an entity in a distributed computing system may be implemented.

FIG. 18 illustrates various components of an exemplary computing-based device 1800 which may be implemented as any form of a computing and/or electronic device, and in which embodiments of an entity in a distributed computing system may be implemented. The device 1800 may be connected to a communications network 1816 as part of a distributed computing system.

Computing-based device 1800 also comprises one or more processors 1802 which may be microprocessors, controllers or any other suitable type of processors for processing computing executable instructions to control the operation of the device in order to operate as part of a distributed computing system. Platform software comprising an operating system 1804 or any other suitable platform software may be provided at the computing-based device to enable application software 1806 to be executed on the device. The computing-based device comprises a graph engine 1810 which implements a dynamic mapping with a distributed computing graph as described herein. A visualization component 1812 may be provided to implement a visualization layer associated with the distributed computing graph. A data store 1808 may be provided to buffer, store or cache data.

The computer executable instructions may be provided using any computer-readable media that is accessible by computing based device 1800. Computer-readable media may include, for example, computer storage media such as memory 1818 and communications media. Computer storage media, such as memory 1818, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1818) is shown within the computing-based device 1800 it will be appreciated that the storage may be distributed or located remotely and accessed via a network or other communication link (e.g. using communication interface 1814).

The computing-based device 1800 also comprises an input/output controller 1826 arranged to output display information to a display device 1820 which may be separate from or integral to the computing-based device 1800. The display information may provide a graphical user interface. The input/output controller 1826 is also arranged to receive and process input from one or more devices, such as a user input device 1824 (e.g. a mouse or a keyboard). This user input may be used to influence or select data to be presented on the display device 1820. In an embodiment the display device 1820 may also act as the user input device 1824 if it is a touch sensitive display device. The input/output controller 1826 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method at an entity in a distributed computing system comprising:

providing an input arranged to connect to the distributed computing system and access a distributed computing graph associated with an activity to be carried out in the distributed computing system, the distributed computing graph representing currently executing processes in the distributed computing system;

arranging a processor to provide a dynamic mapping between the distributed computing graph and a data structure at the entity holding a graph layout view of the distributed computing graph such that changes in the graph layout view are reflected in the distributed computing graph;

receiving user input adding an icon in the graph layout view the icon having associated specified functionality; and using the processor to update the distributed computing graph to provide the specified functionality, the icon representing a bus and the associated specified functionality being that a plurality of the currently executing processes which are connected by the bus in the graph layout view are able to read and/or write data to the bus such that any data written to the bus is visible to all those processes connected to the bus which are able to read, and wherein:

the method further comprises arranging the processor to add at least one data store to the distributed computing graph at a location on the bus selected by the processor using rules, that data store being arranged to store data written to it at specified intervals and providing a user interface enabling control of the activity using the graph layout view and wherein the data store is not part of the graph layout view such that a user viewing a display of the graph layout view does not see the data store;

the method further comprises arranging the processor to, for each process able to write to the bus, observe feeds to that process using the distributed computing graph and to use the observations to decide whether existing data stored in the data store may be written to the bus; or the distributed computing graph comprises at least one community being a region of the distributed computing graph containing specified ones of the currently executing processes, and wherein the processor is arranged to add a first data store at a location on the bus inside the community and a second data store at a location on the bus outside the community, and to store the same data in the first and second data stores.

2. A method as claimed in claim 1 which further comprises exporting the graph layout view and the distributed computing graph.

3. A method as claimed in claim 1 which comprises arranging the processor to add at least one data store to the distributed computing graph at a location on the bus selected by the processor using rules, that data store being arranged to store data written to it at specified intervals.

4. A method as claimed in claim 3 which further comprises providing a user interface enabling control of the activity using the graph layout view and wherein the data store is not part of the graph layout view such that a user viewing a display of the graph layout view does not see the data store.

5. A method as claimed in claim 1 which further comprises, arranging the processor to, for each process able to write to the bus, observe feeds to that process using the distributed computing graph and to use the observations to decide whether existing data stored in the data store may be written to the bus.

6. A method as claimed in claim 1 wherein the distributed computing graph comprises at least one community being a region of the distributed computing graph containing specified ones of the currently executing processes, and wherein the processor is arranged to add a first data store at a location on the bus inside the community and a second data store at a location on the bus outside the community, and to store the same data in the first and second data stores.

7. A method as claimed in claim 1 wherein the icon represents a spooler-player mechanism and the associated specified functionality is that a rate of calculation provided by at least one of the currently executing processes may be decoupled from a rate of visualization of results of that currently executing process.

8. A method as claimed in claim 1 wherein the icon represents a spooler-player mechanism and where the method comprises arranging the processor to add a spooler-player process to the distributed computing graph together with a data store, the spooler-player process being arranged to store data received from one or more of the currently executing processes in the data store and to play that data from the data store to a display.

9. A method as claimed in claim 8 which comprises arranging the processor to provide a user interface device at the display and to receive user input at that device specifying a required data value, the spooler-player process being arranged to request the required data value from the one or more currently executing processes.

10. A method as claimed in claim 1 wherein the icon represents a multiplex mechanism and wherein the associated specified functionality is that a plurality of the currently executing processes, each operable at a different scale of data analysis, maybe selected between using the multiplex mechanism.

11. A method as claimed in claim 1 wherein the processor is arranged to update the distributed computing graph to incorporate a multiplex mechanism according to the icon and to add at least one user control process to the distributed computing graph arranged to enable a user to operate the multiplex mechanism.

12. A method as claimed in claim 1 wherein the icon represents a debugging breakpoint and wherein the method comprises using the processor to insert a buffer in the distributed computing graph together with logic to implement the debugging breakpoint.

13. A method as claimed in claim 12 wherein the processor is arranged to insert logic which controls the flow of data through the buffer.

14. A method as claimed in claim 1 wherein the icon represents a debugging inspector and wherein the method comprises using the processor to automatically connect a user interface item to the distributed computation graph in order to display data from one or more of the currently executing processes.

15. A method as claimed in claim 1 wherein the icon represents a navigation logic process arranged to use data from at least one of the currently executing processes and to control a display of data from the currently executing processes using that data.

16. A method as claimed in claim 15 which comprises connecting at least one of the currently executing processes to a plurality of display items and selecting which of the display items to present at a display using the navigation logic.

17. A method as claimed in claim 1 which further comprises exporting the graph layout view and the distributed computing graph to a standalone executable format.

18. A graph engine comprising:

an input arranged to connect to a distributed computing system and access a distributed computing graph associated with an activity to be carried out in the distributed computing system, the distributed computing graph representing currently executing processes in the distributed computing system;

a processor arranged to provide a dynamic mapping between the distributed computing graph and a data structure holding a graph layout view of the distributed computing graph such that changes in the graph layout view are reflected in the distributed computing graph;

an input arranged to detect an icon added in the graph layout view the icon having associated specified functionality; and the processor being arranged to update the distributed computing graph to provide the specified functionality, the icon representing a bus and the associated specified functionality being that a plurality of the currently executing processes which are connected by the bus in the graph layout view are able to read and/or write data to the bus such that any data written to the bus is visible to all those processes connected to the bus which are able to read, and wherein:

the processor is further arranged to add at least one data store to the distributed computing graph at a location on the bus selected by the processor using rules, that data store being arranged to store data written to it at specified intervals and providing a user interface enabling control of the activity using the graph layout view and wherein the data store is not part of the graph layout view such that a user viewing a display of the graph layout view does not see the data store;

the processor is further arranged to, for each process able to write to the bus, observe feeds to that process using the distributed computing graph and to use the observations to decide whether existing data stored in the data store may be written to the bus; or the distributed computing graph comprises at least one community being a region of the distributed computing graph containing specified ones of the currently executing processes, and wherein the processor is arranged to add a first data store at a location on the bus inside the community and a second data store at a location on the bus outside the community, and to store the same data in the first and second data stores.

19. A graph engine as claimed in claim 18 wherein the icon represents any of: a bus, a spooler-player mechanism, a multiplex mechanism, a debugging breakpoint, a debugging inspector, and a navigator logic.

20. A method at an entity in a distributed computing system comprising:

providing an input arranged to connect to the distributed computing system and access a distributed computing graph associated with an activity to be carried out in the distributed computing system, the distributed computing graph representing currently executing processes in the distributed computing system;

arranging a processor to provide a dynamic mapping between the distributed computing graph and a data structure at the entity holding a graph layout view of the distributed computing graph such that changes in the graph layout view are reflected in the distributed computing graph;

receiving user input adding a bus icon in the graph layout view connecting nodes in the graph layout view representing the currently executing processes; and using the processor to update the distributed computing graph such that the currently executing processes which are connected by the bus in the graph layout view are able to read and/or write data to the bus and any data written to the bus is visible to all those processes connected to the bus which are able to read, wherein:

the method further comprises arranging the processor to add at least one data store to the distributed computing graph at a location on the bus selected by the processor using rules, that data store being arranged to store data written to it at specified intervals and providing a user interface enabling control of the activity using the graph layout view and wherein the data store is not part of the graph layout view such that a user viewing a display of the graph layout view does not see the data store;

the method further comprises arranging the processor to, for each process able to write to the bus, observe feeds to that process using the distributed computing graph and to use the observations to decide whether existing data stored in the data store may be written to the bus; or the distributed computing graph comprises at least one community being a region of the distributed computing graph containing specified ones of the currently executing processes, and wherein the processor is arranged to add a first data store at a location on the bus inside the community and a second data store at a location on the bus outside the community, and to store the same data in the first and second data stores.

* * * * *